(12) United States Patent
Jennings et al.

(10) Patent No.: US 6,290,102 B1
(45) Date of Patent: Sep. 18, 2001

(54) LIQUID MEASURING AND DISPENSING CONTAINER

(76) Inventors: Robert Michael Jennings, 4 Curtis Trail, Martinsville, NJ (US) 08836; David Allen Jennings, 28 Bayberry La., Mountainside, NJ (US) 07092

(*) Notice: Subject to any disclaimer, the term of this patent is extended or adjusted under 35 U.S.C. 154(b) by 0 days.

(21) Appl. No.: 09/540,722

(22) Filed: Mar. 31, 2000

(51) Int. Cl.$^7$ ........................................ B67D 5/38
(52) U.S. Cl. .................................. 222/158; 222/205
(58) Field of Search ........................... 222/205, 158, 222/157, 196.1, 207, 211; 220/501, 666; 215/6, 4, 3, 43, 45, 265

(56) References Cited

U.S. PATENT DOCUMENTS

| | | |
|---|---|---|
| 236,997 | 1/1881 | Dodge . |
| 570,759 | 11/1896 | Law . |
| 697,830 | 4/1902 | Franc . |
| 845,175 | 2/1907 | Hutchins . |
| 856,543 | 6/1907 | Nolan . |
| 1,009,550 | 11/1911 | Moys . |
| 1,066,127 | 7/1913 | Lewis . |
| 1,093,740 | 4/1914 | Stevenson . |
| 1,373,535 | 4/1921 | Smith . |
| 1,438,892 | 12/1922 | Boykin . |
| 1,924,809 | 8/1933 | Schuelke et al. ............... 215/57 |
| 2,017,209 | 10/1935 | Kennedy ........................ 221/147 |
| 2,091,929 | 8/1937 | Kappenberg ................... 221/147 |
| 2,204,104 | 6/1940 | Masters ........................... 221/98 |
| 2,370,820 | 3/1945 | Stott ................................ 222/454 |
| 2,584,130 | 2/1952 | Huebl et al. ................... 222/455 |
| 2,599,446 | 6/1952 | Greene ........................... 222/205 |
| 2,645,388 | 7/1953 | Hester ............................. 222/454 |
| 2,730,270 | 1/1956 | Heinemann ..................... 222/205 |
| 2,743,849 | 5/1956 | Elsas .............................. 222/205 |
| 2,761,833 | 9/1956 | Ward ............................... 210/24 |
| 3,029,001 | 4/1962 | Blish ............................... 222/207 |
| 3,089,623 | 5/1963 | Padzieski ........................ 222/205 |
| 3,141,574 | 7/1964 | Donoghue ...................... 222/157 |

(List continued on next page.)

FOREIGN PATENT DOCUMENTS

| | | |
|---|---|---|
| 439083 | 6/1967 | (CH) . |
| 2802210 | 7/1979 | (DE) . |
| 3017457 | 11/1980 | (DE) . |
| 0010965 | 5/1980 | (EP) . |
| 2601652 | 1/1988 | (FR) . |
| 2038779 | 5/1980 | (GB) . |
| 2166522 | 9/1983 | (GB) . |
| 2129774 | 5/1984 | (GB) . |
| 59181073 | 12/1984 | (JP) . |

OTHER PUBLICATIONS

"Tip 'N' Measure the Exact Amount." Pest Control, 1980 Buyers Guide.
"Tip 'N' Measure the Exact Amount." Pest Control, May 1980, p. 11.
"Tip 'N' Measure the Exact Amount." Pest Control, Oct. 1980, p. 40.
English Translation of DE 3017457 dated Nov. 27, 1980.
English Translation of CH 439083 dated Jun. 30, 1967.

(List continued on next page.)

Primary Examiner—Philippe Derakshani
Assistant Examiner—Thach H Bui
(74) Attorney, Agent, or Firm—Ladas & Parry

(57) ABSTRACT

A liquid dispensing container including a reservoir chamber and a measuring chamber separated therefrom but in liquid communication therewith. A liquid transfer tube interconnects the reservoir chamber and the measuring chamber and, in a preferred embodiment is partly incorporated in wall structure separating the two chambers. A closable opening leads directly into the reservoir for filing the reservoir and a further closable opening leads from the measuring chamber for dispensing a measured volume of liquid. The walls of the reservoir chamber are flexible and may be pressed to force liquid from the reservoir through the tube and into the measuring chamber.

6 Claims, 5 Drawing Sheets

U.S. PATENT DOCUMENTS

| | | | |
|---|---|---|---|
| 3,235,143 | 2/1966 | Goodrich | 222/454 |
| 3,246,807 | 4/1966 | Micallef | 222/207 |
| 3,254,809 | 6/1966 | Breneman | 222/442 |
| 3,347,420 | 10/1967 | Donoghue | 222/129 |
| 3,353,725 | 11/1967 | Caceres | 222/456 |
| 3,396,875 | 8/1968 | Finch | 222/456 |
| 3,401,840 | 9/1968 | McConnell et al. | 222/158 |
| 4,069,946 | 1/1978 | Flider | 222/1 |
| 4,077,547 | 3/1978 | Donoghue | 222/207 |
| 4,079,859 | 3/1978 | Jennings | 222/1 |
| 4,105,142 | 8/1978 | Morris | 222/158 |
| 4,106,673 | 8/1978 | Donoghue | 222/207 |
| 4,298,038 | 11/1981 | Jennings | 141/2 |
| 4,418,843 | 12/1983 | Jackman | 222/158 |
| 4,432,763 | 2/1984 | Manschot et al. | 604/262 |
| 4,646,948 | 3/1987 | Jennings | 222/454 |
| 4,860,927 | 8/1989 | Grinde | 222/158 |
| 4,893,732 | 1/1990 | Jennings | 222/109 |
| 5,165,576 | 11/1992 | Hickerson | 222/158 |
| 5,261,575 | 11/1993 | Keller | 222/455 |
| 5,447,245 * | 9/1995 | Merhar | 215/6 |
| 5,556,011 | 9/1996 | Jennings et al. | 222/455 |
| 6,022,134 * | 2/2000 | Andrews | 215/6 |

OTHER PUBLICATIONS

Abridged English Translation of JP 59181073 dated Dec. 3, 1984.

"Tip 'N' Measure the Exact Amount." Pest Control, Oct. 1980.

"Measuring Chemicals—Made Simple." Pest Control, Nov. 1980, p. 96.

"Measuring Chemicals—Made Simple." Pest Control, Dec. 1980.

"Automating an 'Oddball'." Packaging Digest, May 1997.

"Barex Barrier Resins Application Case History." BP Chemicals, 1993, No. 11.

"Squeeze–Meter Measuring Bottle" Brochure of Charter Supply.

"Prop 'R Measure Storage Container" from Prop 'R Products Ltd. (1987) Dealer Price Schedule and Policy.

E&B Discount Marine 1993 Discount Marine Catalog, (1993) pp 82 & 84.

* cited by examiner

LIQUID MEASURING AND DISPENSING CONTAINER

BACKGROUND OF THE INVENTION

The invention relates to containers for storing and dispensing measured volumes of liquid.

U.S. Pat. Nos. 4,646,948 and 4,893,732 disclose containers having at least two chambers or compartments. One chamber acts as a reservoir for storing liquid and the other chamber is a measuring and dispensing chamber arranged to receive a predetermined volume of liquid from the reservoir chamber and then dispense or discharge that measured volume.

In both these prior patents liquid is transferred from the reservoir chamber to the measuring chamber by tilting the container from an upright position to pour liquid from the reservoir through a channel or over a ledge into the measuring and dispensing chamber. When the container is then returned to its original upright position, the predetermined volume of measured liquid remains in the measuring or dispensing chamber and can subsequently be dispensed therefrom. In the case of U.S. Pat. No. 4,464,948 a graduated scale is provided on a wall portion of the measuring chamber and, with said wall portion being transparent or translucent, the amount of liquid poured into the measuring chamber can be controlled by visually monitoring the poured volume on the graduated scale which requires delicate control of the manual tilting of the container. In the case of U.S. Pat. No. 4,464,948 the container can be tilted to overfill the measuring and dispensing chamber whereupon the container is returned to its initial upright position and excess liquid is returned through a small bore or bleed hole provided in the web or wall portion separating the measuring and dispensing chambers to provide an exact dosage of liquid in the measuring chamber for subsequent dispensing.

U.S. Pat. Nos. 2,599,446, 2,743,849, 3,141,574 and 3,347,420 are all concerned with containers for measuring discrete quantities of a liquid by transferring liquid from a storage chamber to a separate chamber by squeezing the storage chamber to force liquid through a transfer conduit to the separate chamber. However, in all embodiments disclosed in these four patents it is necessary to disassemble the container in order to fill the storage chamber. Disassembly is effected either by separating the chambers or by removing the transfer conduit.

SUMMARY OF THE INVENTION

The container of the present invention has the advantage of facilitating accurate measurement of a predetermined volume of liquid without such liquid being exposed to ambient air. Moreover, the container is susceptible to refilling of the reservoir without the inconvenience of having to dismantle or rearrange components of the container.

According to the present invention there is provided a liquid dispensing container including a flexible walled reservoir chamber, a measuring chamber, a first pour spout opening into said reservoir chamber and a second pour spout leading from said measuring chamber, first and second sealing means respectively operatively associated with said first and second pour spouts, a partition isolating said measuring chamber from said reservoir chamber and an elongated conduit leading from said reservoir chamber and passing through said partition to provide access to said measuring chamber.

The liquid dispensing container includes a reservoir chamber, a measuring chamber in liquid communication with said reservoir chamber, means for transferring a measured amount of liquid from said reservoir chamber to said measuring chamber and a closable outlet for discharging said measured amount from said measuring chamber, wherein the container has resilient walls, wherein a closable inlet opens into said reservoir chamber for filling said reservoir chamber with liquid to be dispensed and a closable outlet leads from said measuring chamber for dispensing said measured amount therefrom and wherein the means for transferring the measured amount of liquid from the reservoir chamber to the measuring chamber includes a tube having one end located in the reservoir chamber to lie within liquid contained therein and an opposite end exiting into the measuring chamber whereby, with the measuring chamber vented, pressure applied to the resilient walls of the container will cause liquid to flow from the reservoir chamber through the tube and into the measuring chamber to accumulate a measured amount therein.

In order that the present invention may be more clearly understood and readily carried into effect, various embodiments of the invention will now be described with reference to the accompanying drawings, in which

DESCRIPTION OF PREFERRED EMBODIMENTS

Figure 1:
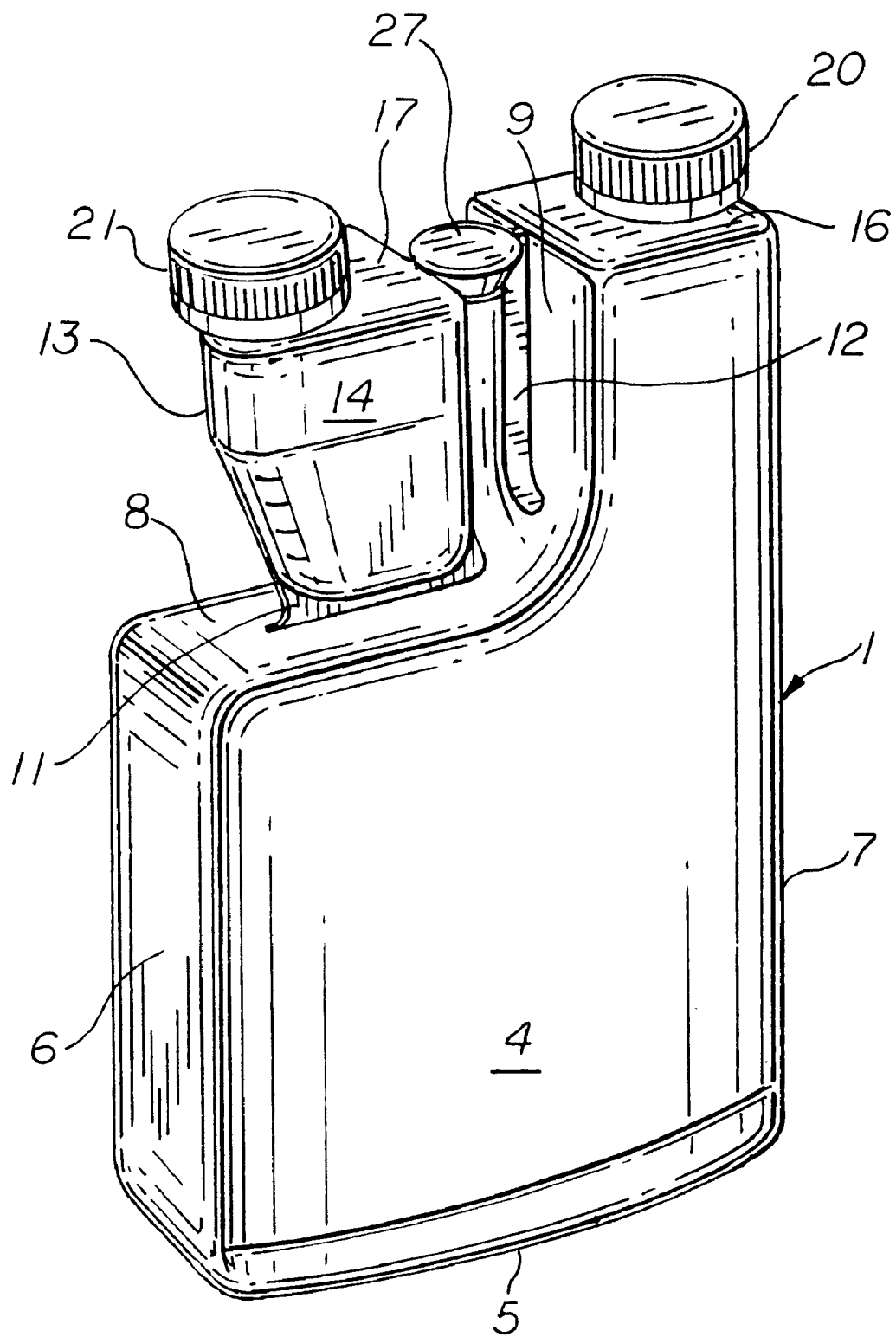
FIG. 1 is a perspective view of one embodiment of a measuring and dispensing container according to the invention.

FIG. 1 shows a perspective view of a measuring and dispensing container 1 of the invention. The container includes a reservoir chamber 2 and a measuring and dispensing camber 3 isolated from the reservoir chamber in a manner to be described hereinafter. The reservoir chamber 2 is defined by side walls 4, a bottom 5, a front wall 6, and a rear wall 7. The reservoir chamber is stepped in its upper region to define a half-wall 8 and an upright wall portion 9 which, together with the side and rear walls 4,7, defines an entrance region 10 for filing purposes. It will be appreciated that, although only one side wall 4 is shown, the opposite side wall of the container is a mirror image hereof.

The measuring and dispensing chamber 3 is located within the stepped region of the container and is secured to, but separated from, the reservoir chamber by webs or fillets 11, 12 created during molding of the container.

The measuring and dispensing chamber 3 has a bottom portion abutting the web 11 in the stepped area, front and side walls 13, 14 and a rear wall 15 abutting the web 12 which bridges the space between said rear wall 15 and the upright wall portion 9 of the container entrance region 10.

Figure 7:
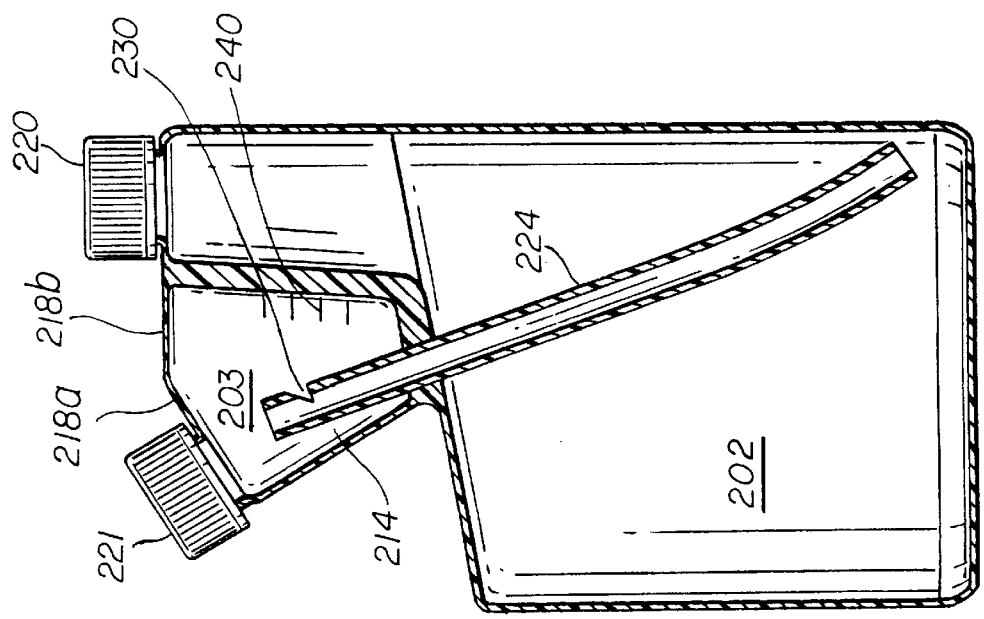
FIG. 7 is a side elevation of a third embodiment of the invention.

Upper walls 16, 17 of the entrance region 10 and measuring and dispensing chamber 3 respectively can lie substantially in the same plane or may have an angled upper wall portion 218A, 218B as shown in the embodiment of FIG. 7.

Figure 2:
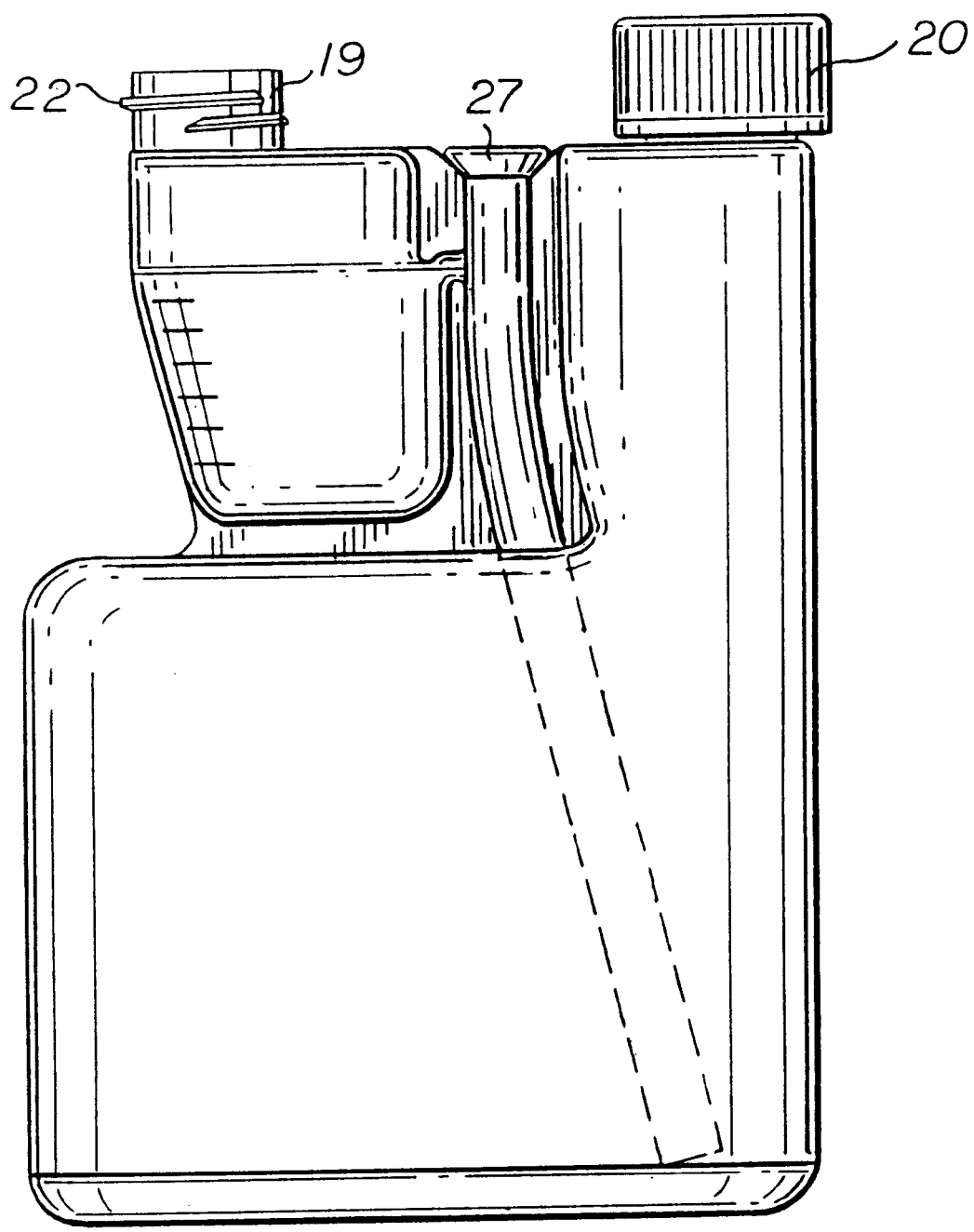
FIG. 2 is a side elevation of the embodiment shown in FIG. 1 with one of the sealing caps removed.

Each of the upper walls 16, 17 terminates in an upwardly directed neck portion. FIG. 2 shows only the neck portion 19 disposed on the upper wall 17 of the measuring and dispensing chamber. Although not shown, a similar neck portion projects upwardly from the upper wall 16 and is closable by a cap 20. Similarly a cap 21 is provided releasably to close the neck portion 19 which serves as a dispensing aperture. As shown in FIG. 2, the neck 19 is screw threaded 22 to mate with internal threads on the cap 21.

Figure 4:
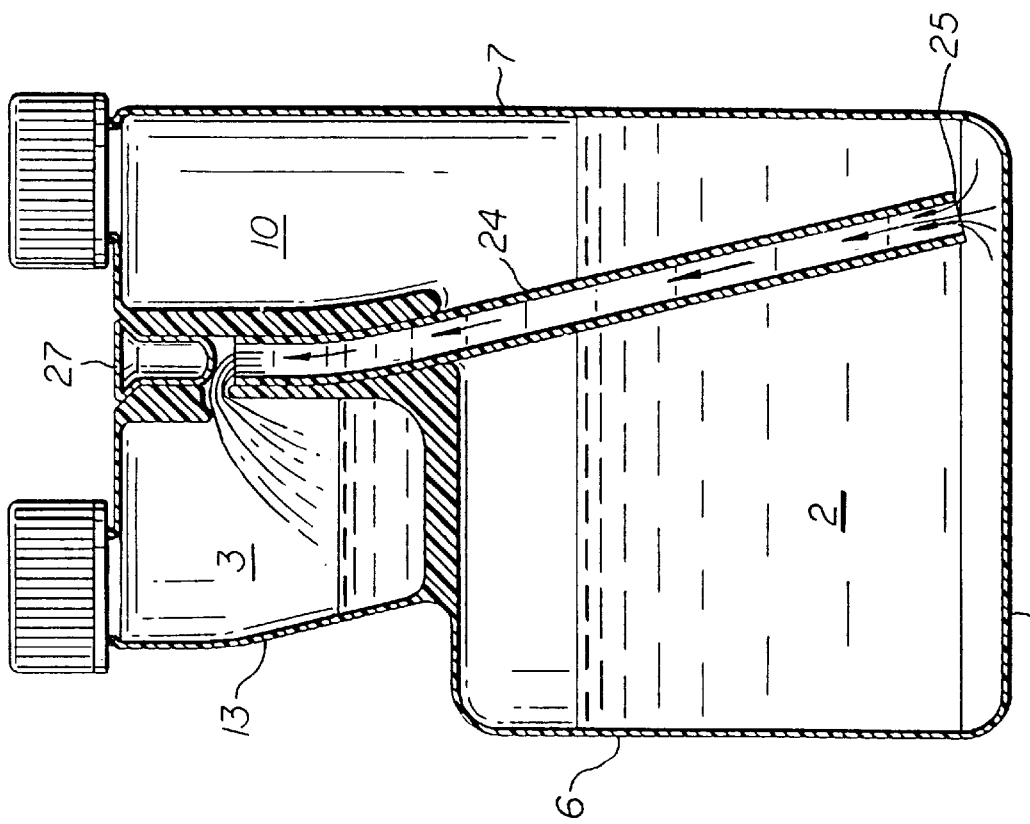
FIG. 4 is view similar to FIG. 3 but shows liquid passing from the reservoir to the measuring and dispensing chamber.
Figure 3:
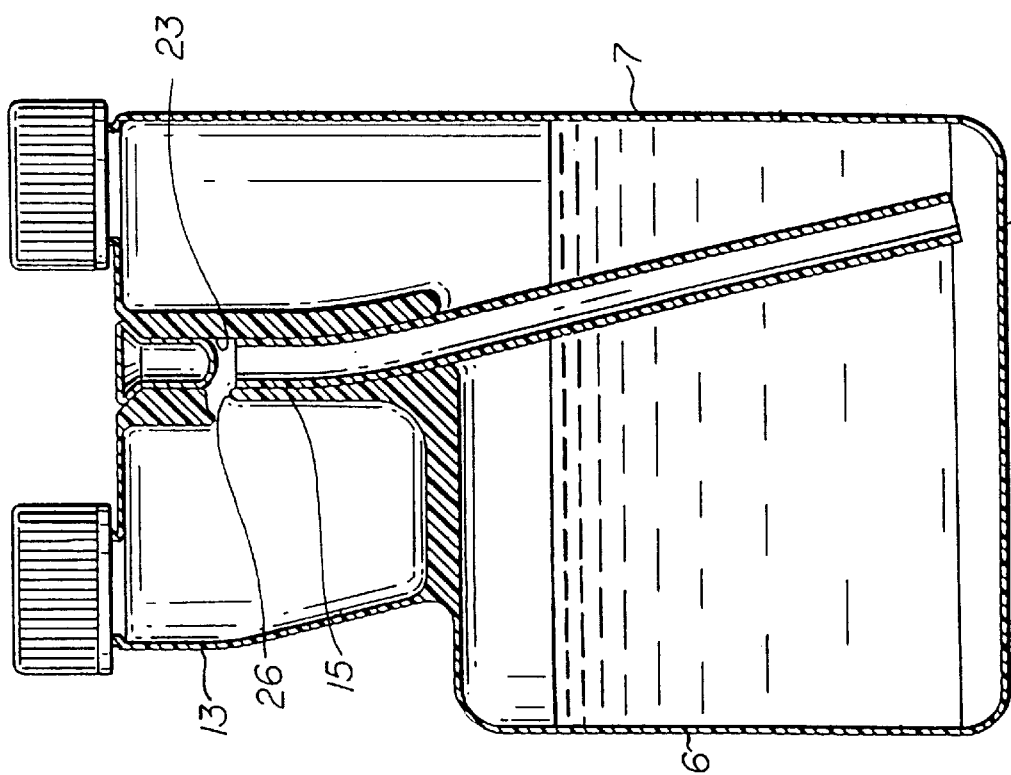
FIG. 3 is a sectioned elevation through the embodiment of FIG. 1 with liquid contained in the reservoir chamber.

As most clearly shown in FIGS. 3 and 4 of the drawings, the web 12 has a longitudinal bore 23 dimensioned to received a tube 24, the purpose of which will become apparent from the following description.

It is particularly advantageous that the bore 23 be angled downwardly and rearwardly in the direction away from the measuring and dispensing chamber 3 so as to locate an open entrance end 25 of the tube 24 in a region proximate the bottom rear edge of the reservoir. Again as most clearly shown in FIGS. 3 and 4 of the drawings, the rear wall 15 of the measuring and dispensing chamber 3 has an opening extending into the bore 23 and in this manner a measuring ledge 26 is provided by the portion of the rear wall 15 which borders said opening. With the open end of the tube 24 disposed below this ledge 26. The ledge becomes a weir over which liquid passing from the reservoir into the measuring and dispensing chamber will flow. Finally, a plug 27 seals the upper region of the bore 23.

Although it would be possible to make the tube 24 an integral molding with the container, the provision of a removable plug 27 enables the tube 24 to be inserted into the bore 23 of a molded container whereupon replacement of the plug 27 will seal the interior chambers from atmosphere.

The use and operation of the container will now be described. With the container assembled as aforesaid and empty, the container reservoir 2 is then filled with liquid through the open neck on the upper wall 16 and passes through the entrance region 10 to adopt a level approximately as shown in FIG. 3 of the drawings. Thereupon the cap 20 is applied and both caps 20 and 21 are tightened to seal the filled container which may then be transported and stored.

To first measure, and then subsequently dispense, a predetermined volume of liquid, the container is held or stood in the upright position shown in FIGS. 1 through 4 of the drawings. Cap 21 is loosened to permit passage of air and the sides 4 of the container are squeezed which has the effect of forcing liquid from the reservoir chamber 2 up through the tube 24 and over the weir formed by the ledge 26. FIG. 4 of the drawings shows this passage of liquid from the reservoir chamber to the measuring chamber.

The ledge 26 determines the volume of liquid with which the measuring and dispensing chamber is charged and when the liquid level in said measuring chamber 3 reaches or exceeds the level defined by the ledge 26, the squeezing action on the side walls 4 of the container 1 is ceased and, with cap 21 still loosened, any liquid remaining above the level of the ledge 26 will flow back over that ledge and through the tube 23 in the reverse direction of that shown by the arrows in FIG. 4. The loosened cap has the effect of venting the two chambers and ensuring that the liquid therein is at rest under atmospheric pressure.

Figure 5:
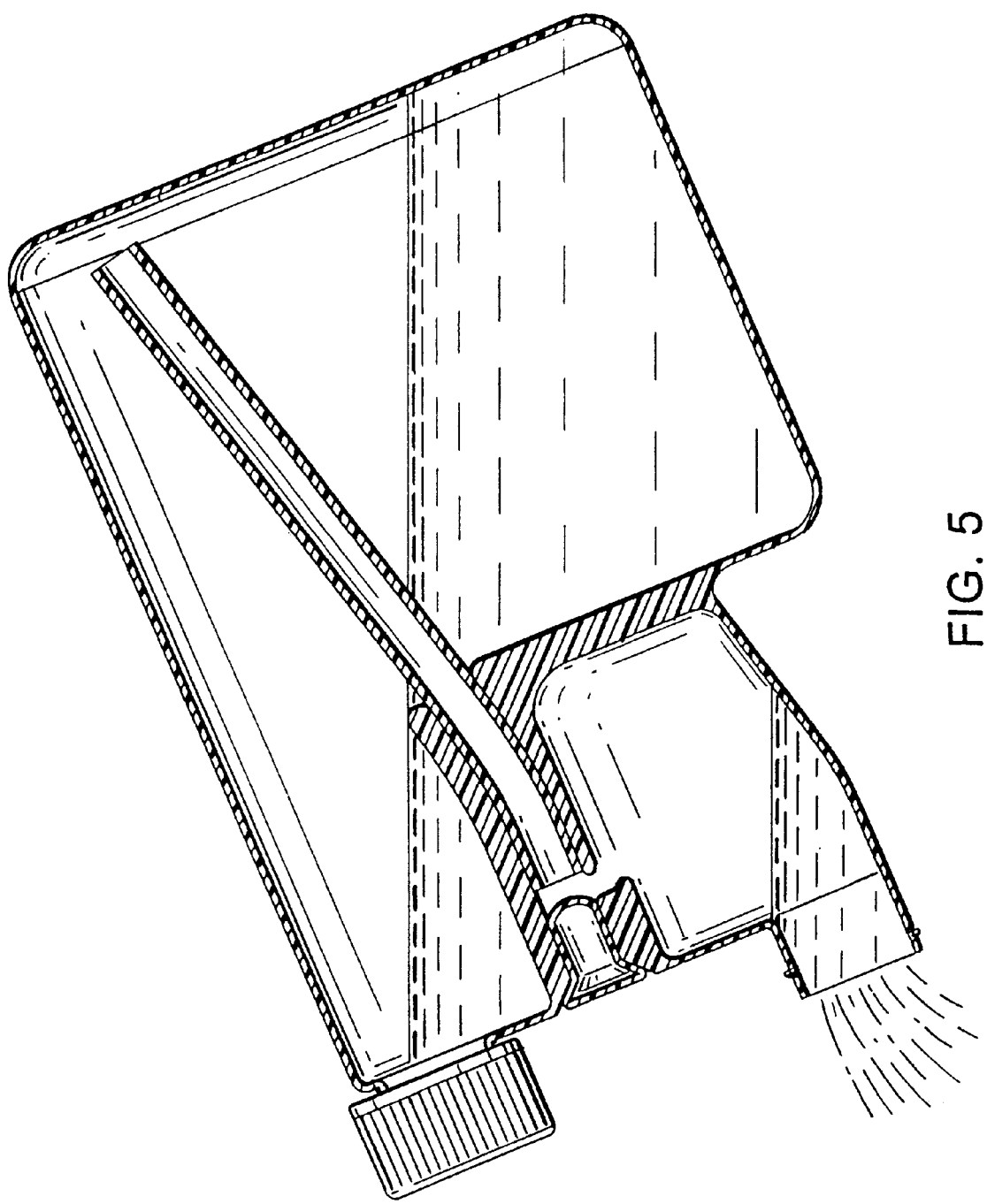
FIG. 5 is a view of the embodiment of FIGS. 1 to 4 shown with the sealing cap of the measuring and dispensing chamber removed and the container tilted to dispense a measured amount of liquid.

Having measured the desired predetermined volume of liquid, the cap 21 is then removed to reveal the pouring neck 19 whereupon the container is tilted in an anticlockwise direction (with respect to FIGS. 1 to 4) to adopt a position similar to that shown in FIG. 5 of the drawings and the measured amount of liquid residing in the measuring and dispensing chamber will flow out through the neck 19 to a desired receptacle.

FIG. 5 further shows how during tilting the liquid remaining in the reservoir cannot penetrate the measuring and dispensing chamber 3 since the bore 23 is firmly sealed by the tube 24 and the remote, or entrance, end of that tube projects well above the surface of the liquid in the tilted reservoir thereby preventing any liquid passing through said tube and running into the measuring and dispensing chamber 3.

Figure 6:
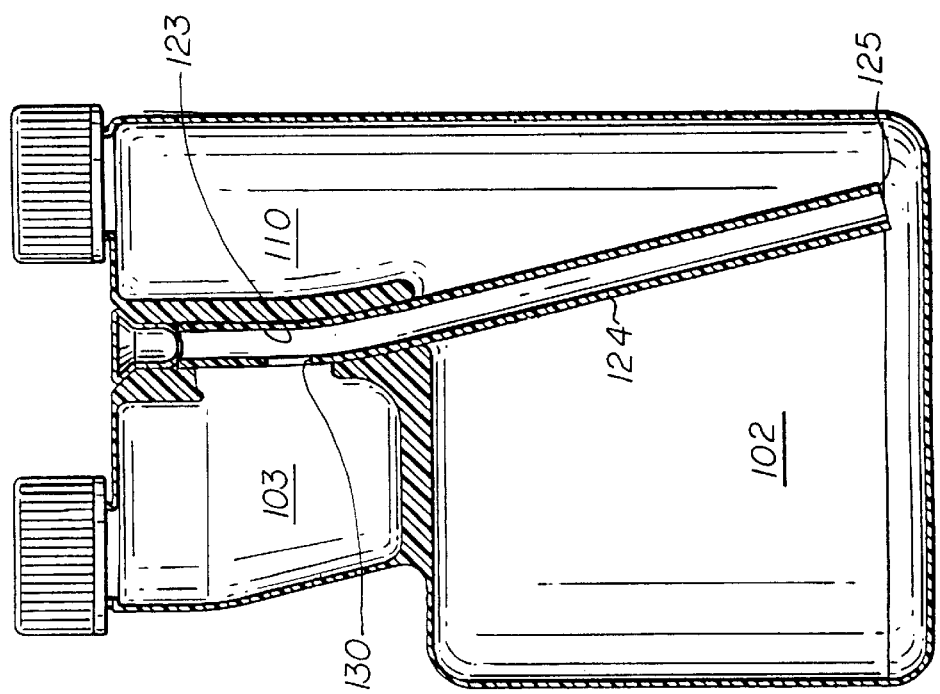
FIG. 6 is a sectioned elevation similar to FIG. 3 but showing a second embodiment of the invention.

FIGS. 6 and 7 show two alternative embodiments of a container of the invention.

The embodiment illustrated in FIG. 6 differs from that shown and described in FIGS. 1 to 5 in the construction of the barrier between the measuring and dispensing chamber 103 and the entrance region 110 to the reservoir chamber 102. In this embodiment, the opening from the measuring and dispensing chamber 103 to the tube accommodating bore 123 is very much larger than the orifice shown in the embodiment of FIGS. 1 to 4 and does not present a weir which serves to control the level of liquid in the measuring and dispensing chamber 103. Instead, the transfer tube 124 extends upwardly through the bore and the uppermost end is located above the uppermost extremity of the opening into the chamber 103. In order for liquid to be able to pass from the tube 124 into the measuring and dispensing chamber 103, an opening 130 is provided in the wall of the tube 124 and is oriented to provide passage from the tube into the chamber 103.

The advantage of this arrangement is that by controlling the extent by which the tube 124 depends through the bore 123, the position adopted by the lowermost extremity of the opening 130 will govern the depth of liquid to be accommodated in measuring and dispensing chamber. In other words, the volume of liquid to be measured in the measuring and dispensing chamber 103 can be controlled by axial movement of the tube 124 in the bore 103.

It is, of course, important that the upper extremity of the tube 124 does not move to a position below the uppermost extremity of the substantial opening from the bore 123 into the chamber 103.

Again, the bore 123 is angled downwardly and rearwardly with respect to the measuring and dispensing chamber 103 in order to ensure that the remote or entrance end 125 of the tube 124 is located in such a position that it will be clear of liquid within the reservoir upon tilting of the container to adopt the pouring position. This position is most clearly shown in the above-discussed FIG. 5 of the drawings.

The embodiment shown in FIG. 7 of the drawings similarly relies upon the application of pressure to the side walls of a flexible reservoir chamber 202 to transfer liquid from within that chamber through a tube 224 to pass into a measuring and dispensing chamber 203. However, the predetermined volume of liquid to be measured in the measuring chamber is not governed by a weir or ledge over which liquid passes into the measuring and dispensing chamber and over which surplus liquid may exit to ensure a predetermined depth. Instead, the side walls 214 of the chamber 203 are transparent or translucent and a graduated scale 240 is scribed or otherwise marked on the chamber walls.

Again, an opening, in the form of a notch 230 is provided in the wall of the tube 224 at a location within the measuring and dispensing chamber 203. Although the opening is in the form of a notch, it would, of course, be possible to have the liquid transferring from the reservoir chamber 202 through the tube 224 to exit that tube through the end located within the measuring and dispensing chamber 203.

In use, with the reservoir chamber 202 filled, the cap 221 is loosened whereupon, with the container in the upright position shown in FIG. 7, the flexible walls of the reservoir chamber 202 are squeezed to force liquid to pass from the reservoir through the tube 224 and through the opening 230 into the chamber 203. Squeezing is gently continued until the level of liquid in the measuring and dispensing chamber rises to the desired level indicated on the scale 240 whereupon the squeezing action is discontinued. In the embodiment shown in FIG. 7, the tube 224 would have to be moved upwardly if a greater depth indicated by the scale 204 were desired since the opening 230 must obviously be above the desired graduation.

Once the desired level is obtained in the measuring and dispensing chamber 203, the cap 221 is removed whereupon the container is tilted in an anticlockwise direction, in a manner similar to that shown in FIG. 5, to pour the measured amount of liquid from the measuring and dispensing chamber 203.

What is claimed is:

1. A liquid dispensing container comprising a bottom, front and rear walls upstanding from said bottom, and side walls upstanding from said bottom and extending between said front and rear walls, a flexible walled reservoir chamber confined by said bottom and upstanding walls, said container having an upper stepped region defining a half wall at the top of the reservoir chamber and an upright wall portion forming an entrance region of the reservoir chamber, a measuring chamber disposed in said upper stepped, region of said container adjacent to said entrance region said measuring chamber extending from said entrance region of said reservoir chamber to said front wall, said entrance region of the reservoir chamber and said measuring chamber being separated by a partition extending at an intermediate position of the container from said top wall to said half wall, a first pour spout opening into said reservoir chamber and a second pour spout leading from said measuring chamber, said first and second pour spouts both being located proximate the top of said container remote from said bottom, first and second sealing means respectively operatively associated with said first and second pour spouts, and an elongated tube extending from said measuring chamber and through said partition to exit therefrom and pass into said reservoir chamber, said elongated tube extending downwardly and diametrically away from said measuring chamber to traverse said reservoir chamber and terminate at a lower open end within said reservoir chamber at a location proximate the bottom and rear wall thereof, such that when the container is tilted to disperse a measured quantity of liquid from the measuring chamber, the open end of the tube will be out of the liquid in the reservoir chamber.

2. A liquid dispensing container as claimed in claim 1, wherein at least part of said partition is hollow and accommodates said tube therein.

3. A liquid dispensing container as claimed in claim 2, wherein the measured amount of liquid is determined by a ledge located in said partition such that when pressure applied to the resilient container walls is relieved, liquid in the measuring chamber in excess of the measured amount will flow back into the reservoir chamber.

4. A liquid dispensing container is claimed in claim 1, wherein the tube has an end which projects into the measuring chamber.

5. A liquid dispensing container as claimed in claim 4, wherein the extent by which the tube projects into the measuring chamber determines the measured amount of liquid and, having filled the measuring chamber to that extent, excess liquid will flow back through the tube into the reservoir chamber when the pressure applied to the resilient container walls is relieved.

6. A liquid dispensing container as claimed in claim 5, wherein an opening is provided in the tube proximate the end within said measuring chamber and wherein a lowermost region of said opening defines a ledge which determines the measured amount of liquid by permitting liquid in excess of the measured amount to flow through said opening back into the reservoir chamber when the pressure applied to the resilient container walls is relieved.

\* \* \* \* \*